United States Patent
Yan et al.

(10) Patent No.: US 9,432,911 B2
(45) Date of Patent: Aug. 30, 2016

(54) MOCN CELL COMMUNICATION METHOD AND APPARATUS

(71) Applicant: Huawei Technologies Co., Ltd., Shenzhen, Guangdong (CN)

(72) Inventors: Haidong Yan, Shanghai (CN); Zhihua Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 14/326,029

(22) Filed: Jul. 8, 2014

(65) Prior Publication Data

US 2014/0323140 A1 Oct. 30, 2014

Related U.S. Application Data

(63) Continuation of application No. PCT/CN2012/087343, filed on Dec. 24, 2012.

(51) Int. Cl.
*H04W 48/10* (2009.01)
*H04W 16/10* (2009.01)
(Continued)

(52) U.S. Cl.
CPC ............ *H04W 48/10* (2013.01); *H04W 16/10* (2013.01); *H04W 48/12* (2013.01); *H04W 72/10* (2013.01); *H04W 16/14* (2013.01); *H04W 28/16* (2013.01); *H04W 48/18* (2013.01); *H04W 72/04* (2013.01)

(58) Field of Classification Search
CPC ... H04W 16/10; H04W 48/10; H04W 72/10; H04W 16/14; H04W 72/04; H04W 28/16
See application file for complete search history.

(56) References Cited

U.S. PATENT DOCUMENTS

2007/0135113 A1  6/2007 Moinet et al.
2008/0043679 A1* 2/2008 Karlsson ............... H04W 16/14
                                                          370/335
(Continued)

FOREIGN PATENT DOCUMENTS

CN  101232729 A  7/2008
CN  101282508 A  10/2008
(Continued)

OTHER PUBLICATIONS

"Full MOCN and Mobility," 3GPP TSG GERAN #53, Hamburg, Germany, GP-120213, Agenda Item—7.2.5.3.1, 3rd Generation Partnership Project, Valbonne, France (Feb. 27-Mar. 2, 2012).
(Continued)

*Primary Examiner* — Barry Taylor
(74) *Attorney, Agent, or Firm* — Leydig, Voit & Mayer, Ltd.

(57) ABSTRACT

The present disclosure discloses an MOCN cell communication method and an apparatus and relates to the communications field, which are used to solve a problem in the prior art that a part of UEs in an MOCN cell cannot correctly display names of their serving communication operators. The method provided by the present disclosure includes: determining the number n of communication operators of an MOCN cell and configuring n BCCHs for the MOCN cell, where the n BCCHs are in one-to-one correspondence with the communication operators and are used to broadcast in the MOCN cell PLMN information of the communication operators; and sending, to UEs in the MOCN cell, PLMN information of serving communication operators of the UEs through the n broadcast control channels. The present disclosure is applicable to the communications field and used to implement MOCN cell communication.

10 Claims, 4 Drawing Sheets

(51) Int. Cl.
*H04W 48/12* (2009.01)
*H04W 72/10* (2009.01)
*H04W 16/14* (2009.01)
*H04W 72/04* (2009.01)
*H04W 28/16* (2009.01)
*H04W 48/18* (2009.01)

(56) References Cited

U.S. PATENT DOCUMENTS

| | | | |
|---|---|---|---|
| 2009/0213834 A1 | 8/2009 | Amirijoo et al. | |
| 2010/0195643 A1* | 8/2010 | Kodali | H04W 48/18 370/352 |
| 2012/0064905 A1* | 3/2012 | Gustavsson | H04W 28/16 455/450 |
| 2012/0100892 A1* | 4/2012 | Arzelier | G06F 3/14 455/566 |
| 2013/0142070 A1 | 6/2013 | Matsuo et al. | |

FOREIGN PATENT DOCUMENTS

| | | |
|---|---|---|
| CN | 101500278 A | 8/2009 |
| CN | 101674602 A | 3/2010 |
| CN | 102026328 A | 4/2011 |
| CN | 102571581 A | 7/2012 |
| EP | 1686827 A1 | 8/2006 |
| EP | 1799003 A1 | 6/2007 |
| EP | 2219408 A2 | 8/2010 |
| EP | 2563050 A1 | 2/2013 |
| GB | 2490968 A | 11/2012 |
| WO | WO 2008048158 A1 | 4/2008 |
| WO | WO 2012148329 A1 | 11/2012 |

OTHER PUBLICATIONS

"GSM/EDGE RAN sharing," 3GPP TSG GERAN2 #45bis, Copenhagen, Denmark, Tdoc G2-100227, Agenda Item: 5.3.4, 3$^{rd}$ Generation Partnership Project, Valbonne, France (Apr. 21-23, 2010).

* cited by examiner

MOCN CELL COMMUNICATION METHOD AND APPARATUS

CROSS-REFERENCE TO RELATED APPLICATIONS

This application is a continuation of International Patent Application No. PCT/CN2012/087343, filed on Dec. 24, 2012, which is hereby incorporated by reference in its entirety.

TECHNICAL FIELD

The present disclosure relates to the communications field, and in particular, to an MOCN (multiple operation core network) cell communication method and an apparatus.

BACKGROUND

Along with the rapid development of communications technologies, scarcity of spectrum resources, operation and maintenance management costs of communications equipment and the like become important factors which influence development of communication operators. By an MOCN technology, one radio network can be connected to core network nodes of multiple operators and the multiple operators share the same radio network, so that the multiple operators share spectrum resources and a BSS (base station subsystem) device, thereby increasing a utilization ratio of spectrum resources and reducing operation and maintenance costs of communication operators. An MOCN cell is a cell which is covered by multiple operators jointly by using the MOCN technology, where a BSS device that controls the MOCN cell and air interface resources of the MOCN cell is shared by the multiple operators.

According to the GSM (Global System for Mobile Communications) protocol, only one piece of PLMN (public land mobile network) information can be broadcast in one cell, so PLMN information acquired by all UEs (user equipments) in the MOCN cell is the same and displayed operator names are the same. However, the UEs in the MOCN cell belong to multiple different communication operators. As a result, a part of the UEs cannot correctly display names of their serving communication operators.

SUMMARY

Embodiments of the present disclosure provide an MOCN cell communication method and an apparatus, which can solve the problem in the prior art that a part of UEs cannot correctly display names of their serving communication operators.

In order to achieve the foregoing objective, the embodiments of the present disclosure adopt the following technical solutions:

According to a first aspect, an embodiment of the present disclosure provides a multiple operation core network MOCN cell communication method, where the method includes:

determining the number n of communication operators of an MOCN cell and configuring n broadcast control channels BCCHs for the MOCN cell, where the n broadcast control channels are in one-to-one correspondence with the communication operators and are used to broadcast in the MOCN cell public land mobile network PLMN information of the communication operators; and sending, to user equipments UEs in the MOCN cell, PLMN information of communication operators to which the UEs belong through the n broadcast control channels In a first possible implementation manner, the determining the number n of communication operators of an MOCN cell and configuring n broadcast control channels BCCHs for the MOCN cell includes:

acquiring configuration information of the MOCN cell from a base station which manages the MOCN cell and determining the number n of communication operators of the MOCN cell; and configuring idle channels or service channels with low service priorities of the MOCN cell as broadcast control channels, so that the MOCN cell is configured with n broadcast control channels.

With reference to the first aspect or the first possible implementation manner of the first aspect, in a second possible implementation manner, the sending, to user equipments UEs in the MOCN cell, PLMN information of serving communication operators of the UEs through the n broadcast control channels includes:

determining a communication operator to which a UE in the MOCN cell belongs as a first operator; and sending PLMN information of the first operator to the UE through a broadcast control channel which is in one-to-one correspondence with the first operator, so that the UE displays a network name of the first operator.

According to a second aspect, an embodiment of the present disclosure provides a multiple operation core network MOCN cell communication method, where the method includes:

when receiving an access request sent by a user equipment UE, detecting whether an idle channel exists in an MOCN cell whose access is requested by the UE; and if yes, assigning the idle channel to the UE, so that the UE accesses the MOCN cell for communication; and if not, processing, according to a preset rule, the access request sent by the UE so as to allow the UE to access the MOCN cell by pre-empting a channel resource which is being used by another UE, or reject access of the UE to the MOCN cell.

In a first possible implementation manner, the preset rule is set by negotiation of multiple communication operators of the MOCN cell and is used to determine, in a scenario where all channel resources of the MOCN cell are occupied, a proportion coefficient of channel resources occupied by each communication operator to total channel resources of the MOCN cell.

With reference to the first possible implementation manner of the second aspect, in a second possible implementation manner, the processing, according to a preset rule, the access request sent by the UE includes:

determining, according to the proportion coefficient and the total number of channel resources of the MOCN cell, the maximum number of channel resources which can be occupied by a first communication operator of the UE in the MOCN cell, where the first communication operator is a communication operator to which the UE belongs;

detecting whether the number of channel resources currently occupied by the first communication operator reaches the maximum number of channel resources; and if yes, adjusting the channel resources currently occupied by the first communication operator and processing the received access request; and if not, assigning a channel resource occupied by a remaining communication operator to the UE, so that the UE accesses the MOCN cell for communication, where remaining communication operator is all communication operator which share the MOCN cell except the first communication operator.

With reference to the second possible implementation manner of the second aspect, in a third possible implementation manner, the adjusting the channel resources currently occupied by the first communication operator and processing the received access request includes:

determining a service type of the UE according to the access request and determining a service priority of the UE according to the service type;

detecting a service type of a UE, which has already accessed the MOCN cell, of the first communication operator and determining a service priority of the UE which has already accessed the MOCN cell;

if the service priority of the UE is higher than the service priority of the UE which has already accessed the MOCN cell, assigning to the UE a channel resource occupied by the UE which has already accessed the MOCN cell, so that the UE accesses the MOCN cell for communication; and if the service priority of the UE is lower than or equal to the service priority of the UE which has already accessed the MOCN cell, rejecting the access request or adding the access request to a queue to wait for a channel resource.

With reference to the second possible implementation manner of the second aspect, in a fourth possible implementation manner, the assigning a channel resource occupied by a remaining communication operator to the UE, so that the UE accesses the MOCN cell for communication includes:

detecting service priorities of UEs, which have already accessed the MOCN cell, of the remaining communication operator; and selecting a UE with a lowest service priority from the UEs which have already accessed the MOCN cell as a target UE and assigning a channel resource occupied by the target UE to the UE, so that the UE accesses the MOCN cell for communication.

According to a third aspect, an embodiment of the present disclosure further provides a base station subsystem, where the base station subsystem includes:

a processor, adapted to determine the number n of communication operators of an MOCN cell and configure n broadcast control channels BCCHs for the MOCN cell, where the n broadcast control channels are in one-to-one correspondence with the communication operators and are used to broadcast in the MOCN cell public land mobile network PLMN information of the communication operators; and a transmitter, adapted to send, to user equipments UEs in the MOCN cell, PLMN information of communication operators to which the UEs belong through the n broadcast control channels configured by the processor.

In a first possible implementation manner, the base station subsystem further includes:

a receiver, adapted to acquire configuration information of the MOCN cell from a base station which manages the MOCN cell; and the processor is adapted to determine the number n of communication operators of the MOCN cell according to the configuration information acquired by the receiver and configure idle channels or service channels with low service priorities of the MOCN cell as broadcast control channels, so that the MOCN cell is configured with n broadcast control channels.

According to the third aspect or the first possible implementation manner of the third aspect, in a second possible implementation manner, the process is further adapted to determine a communication operator to which a UE in the MOCN cell belongs as a first operator; and the transmitter is further adapted to send PLMN information of the first operator to the UE through a broadcast control channel which is in one-to-one correspondence with the first operator, so that the UE displays a network name of the first operator.

According to a fourth aspect, an embodiment of the present disclosure further provides a base station subsystem, where the base station subsystem includes:

a receiver, adapted to receive an access request sent by a user equipment UE in an MOCN cell; and a processor, adapted to: when the receiver receives the access request, detect whether an idle channel exists in the MOCN cell whose access is requested by the UE; and if an idle channel exists, assign the idle channel to the UE, so that the UE accesses the MOCN cell for communication; and if no idle channel exists, process, according to a preset rule, the access request sent by the UE so as to allow the UE to access the MOCN cell by pre-empting a channel resource which is being used by another UE, or reject access of the UE to the MOCN cell.

In a first possible implementation manner, the base station subsystem further includes a memory, adapted to store the preset rule which is set by negotiation of multiple operators of the MOCN cell, where the preset rule is used to determine, in a scenario where all channel resources of the MOCN cell are occupied, a proportion coefficient of channel resources occupied by each operator to total channel resources of the MOCN cell.

With reference to the first possible implementation manner of the fourth aspect, in a second possible implementation manner, the processor is specifically adapted to determine, according to the proportion coefficient set by the preset rule and the total number of channel resources of the MOCN cell, the maximum number of channel resources which can be occupied by a first communication operator of the UE in the MOCN cell, where the first communication operator is a communication operator that serves the UE; and the processor is further adapted to detect whether the number of channel resources currently occupied by the first communication operator reaches the maximum number of channel resources; and if yes, adjust the channel resources currently occupied by the first communication operator and process the received access request; and if not, assign a channel resource occupied by a remaining communication operator to the UE, so that the UE accesses the MOCN cell for communication, where the remaining communication operator is all communication operator which share the MOCN cell except the first communication operator.

With reference to the second possible implementation manner of the fourth aspect, in a third possible implementation manner, the processor is specifically adapted to determine a service type of the UE according to the access request and determine a service priority of the UE according to the service type, detect a service type of a UE, which has already accessed the MOCN cell, of the first communication operator and determine a service priority of the UE which has already accessed the MOCN cell;

the processor is further adapted to: if the service priority of the UE is higher than the service priority of the UE which has already accessed the MOCN cell, assign to the UE a channel resource occupied by the UE which has already accessed the MOCN cell, so that the UE accesses the MOCN cell for communication; and the processor is further adapted to: if the service priority of the UE is lower than or equal to the service priority of the UE which has already accessed the MOCN cell, reject the access request or add the access request to a queue to wait for a channel resource.

With reference to the second possible implementation manner of the fourth aspect, in a third possible implementation manner, the processor is specifically adapted to detect service priorities of UEs, which have already accessed the MOCN cell, of the remaining communication operator; and select a UE with a lowest service priority from the UEs which have already accessed the MOCN cell as a target UE, and assign a channel resource occupied by the target UE to the UE, so that the UE accesses the MOCN cell for communication.

According to the MOCN cell communication method and the apparatus provided in the embodiments of the present disclosure, on one hand, multiple broadcast control channels can be configured according to the number of communication operators of an MOCN cell, and further PLMN information of the multiple communication operators can be broadcast in the MOCN cell through the multiple broadcast control channels, so that UEs in the MOCN cell can display names of their serving communication operators correctly; and on the other hand, channel resources can be assigned dynamically according to real-time services of the MOCN cell, thereby ensuring a utilization ratio of channel resources and also ensuring fairness of resource occupation by communication operators.

BRIEF DESCRIPTION OF DRAWINGS

To describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
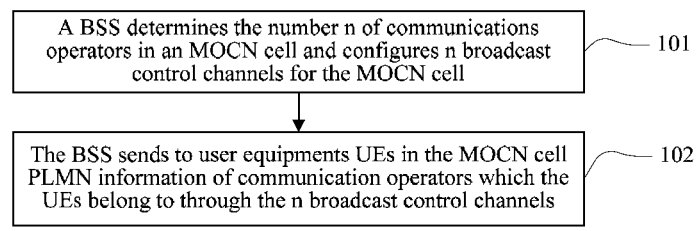
FIG. 1 is a schematic flowchart of an MOCN cell communication method according to Embodiment 1 of the present disclosure.

The embodiment of the present disclosure provides an MOCN cell communication method. As shown in FIG. 1, the method includes:

101. A BSS (base station subsystem) determines the number n of communication operators of an MOCN cell and configures n BCCHs (broadcast control channels) for the MOCN cell, where the n broadcast control channels are in one-to-one correspondence with the communication operators and are used to broadcast in the MOCN cell PLMN information of the communication operators.

The BSS mainly includes a base station and a base station controller. The method provided in this embodiment may be executed by the base station in the BSS or may be executed by the base station controller in the BSS, which is not limited herein.

102. The BSS sends, to user equipments UEs in the MOCN cell, PLMN information of communication operators to which the UEs belong through the n broadcast control channels.

Specifically, the PLMN information includes MCC (mobile country code) information and MNC (mobile network code) information. After a UE acquires the PLMN information, the UE can determine a name of a country where the UE is located and a name of a communication operator to which the UE belongs and display the PLMN information.

According to the MOCN cell communication method provided in the embodiment of the present disclosure, multiple broadcast control channels can be configured according to the number of communication operators of an MOCN cell, and further PLMN information of the multiple communication operators can be broadcast in the MOCN cell through the multiple broadcast control channels, so that UEs in the MOCN cell can display names of communication operators to which the UEs belong correctly.

Embodiment 2

Figure 2:
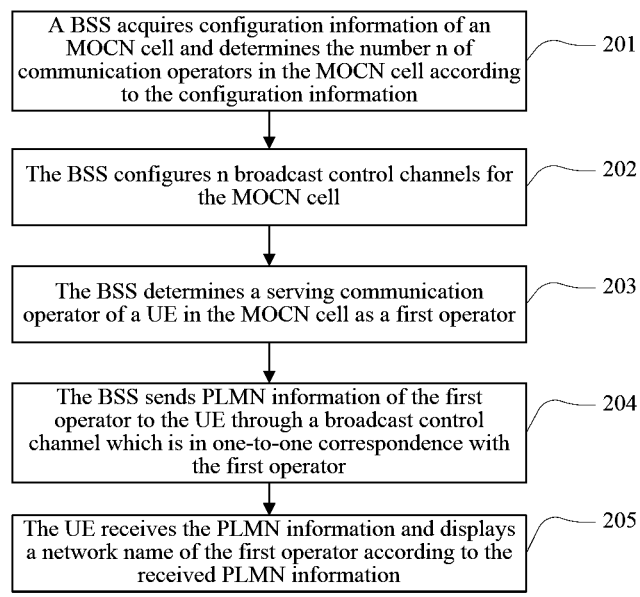
FIG. 2 is a schematic flowchart of an MOCN cell communication method according to Embodiment 2 of the present disclosure.

Based on the embodiment shown in FIG. 1, the embodiment of the present disclosure further provides an MOCN cell communication method. As shown in FIG. 2, the method includes:

201. A BSS acquires configuration information of an MOCN cell and determines the number n of communication operators of the MOCN cell according to the configuration information.

Specifically, the BSS mainly includes a base station and a base station controller, where the configuration information may be stored in the base station or may be stored in the base station controller, which is not limited herein. The configuration information can represent whether each cell is an MOCN cell; and when an MOCN cell exists in cells managed by the BSS, the configuration information further includes the number n of communication operators which share the MOCN cell.

202. The BSS configures n broadcast control channels for the MOCN cell, where the n broadcast control channels are in one-to-one correspondence with the communication operators and are used to broadcast in the MOCN cell PLMN information of the communication operators.

In order to facilitate understanding, this embodiment provides an implementation method for configuring broadcast control channels for reference:

For example, generally, one cell is configured with two carriers which are respectively used to transmit uplink information and downlink information, where each carrier is divided into 8 timeslots and one timeslot corresponds to one channel The BSS may configure idle channels of the MOCN cell as broadcast control channels, so that the MOCN cell is configured with n broadcast control channels Optionally, if communications services in the MOCN cell are busy and no idle channel exists, the BSS may configure service channels with low service priorities as broadcast control channels.

It should be emphasized that the implementation method for configuring broadcast control channels is merely a specific implementation manner, and a person skilled in the art may also select other service channels or control channels as broadcast control channels by using other methods or criteria, which is not limited in this embodiment.

203. The BSS determines a communication operator to which a UE in the MOCN cell belongs as a first operator.

204. The BSS sends PLMN information of the first operator to the UE through a broadcast control channel which is in one-to-one correspondence with the first operator.

For example, if three communication operators (for example, operator A, operator B and the operator C) exist in the MOCN cell, the BSS may configure three broadcast control channels (for example, BCCH1, BCCH2 and BCCH3), and the three broadcast control channels are in one-to-one correspondence with the three communication operators. For example, operator A corresponds to BCCH1, operator B corresponds to BCCH2, and operator C corresponds to BCCH3. Accordingly, based on an actual scenario, a specific implementation manner of steps 203 and 204 is as follows:

if a UE belongs to operator A, PLMN information of operator A is sent to the UE through BCCH1;

if a UE belongs to operator B, PLMN information of operator B is sent to the UE through BCCH2; and if a UE belongs to operator C, PLMN information of operator C is sent to the UE through BCCH3.

205. The UE receives the PLMN information and displays a network name of the first operator according to the received PLMN information.

According to the MOCN cell communication method provided in the embodiment of the present disclosure, multiple broadcast control channels can be configured according to the number of communication operators of an MOCN cell, and further PLMN information of the multiple communication operators can be broadcast in the MOCN cell through the multiple broadcast control channels, so that UEs in the MOCN cell can display names of communication operators to which the UEs belong correctly.

Embodiment 3

Figure 3:
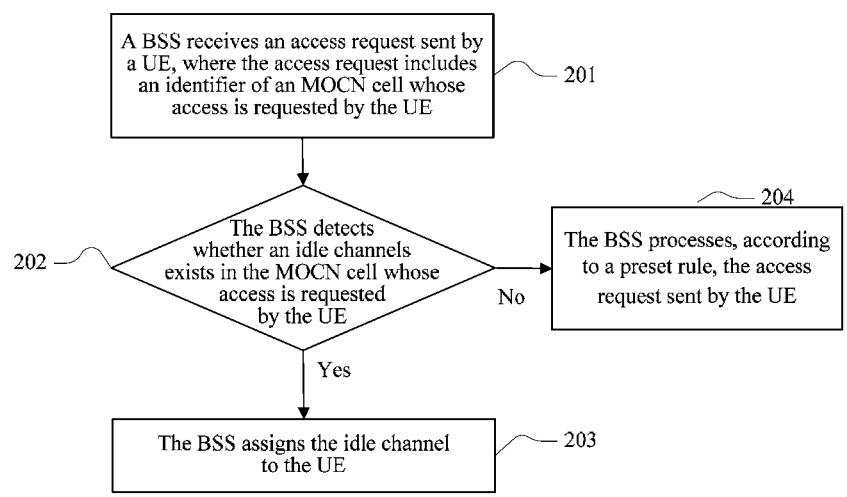
FIG. 3 is a schematic flowchart of an MOCN cell communication method according to Embodiment 3 of the present disclosure.

The embodiment of the present disclosure provides an MOCN cell communication method. As shown in FIG. 3, the method includes:

301. A BSS receives an access request sent by a UE, where the access request includes an identifier of an MOCN cell whose access is requested by the UE.

The BSS mainly includes a base station and a base station controller. The method provided in this embodiment may be executed by the base station in the BSS or may be executed by the base station controller in the BSS, which is not limited herein.

302. The BSS detects whether an idle channel exists in the MOCN cell whose access is requested by the UE.

303. If yes, the BSS assigns the idle channel to the UE, so that the UE accesses the MOCN cell for communication.

304. If not, the BSS processes, according to a preset rule, the access request sent by the UE so as to allow the UE to access the MOCN cell by pre-empting a channel resource which is being used by another UE, or reject access of the UE to the MOCN cell.

The preset rule is set by negotiation of multiple communication operators of the MOCN cell and is used to determine, in a scenario where all channel resources of the MOCN cell are occupied, a proportion coefficient of channel resources occupied by each communication operator to total channel resources of the MOCN cell.

In other words, the BSS in this embodiment performs dynamic assignment of channel resources according to real-time services in the MOCN cell.

When the traffic volume of UEs in the MOCN cell is small (that is, an idle channel resource exists in the MOCN cell), channel resources in the MOCN cell are completely shared by the multiple communication operators. For example, if the number of UEs which belong to communication operator A, of all UEs accessed to the MOCN cell is large, communication operator A occupies a large number of channel resources in the MOCN cell.

When the traffic volume of UEs in the MOCN cell is large (that is, no idle channel resource exists in the MOCN cell), the BSS proportionally assigns channel resources in the MOCN cell to the multiple communication operators according to the proportion coefficient in the preset rule, so as to ensure fairness of resource occupation by the communication operators.

According to the MOCN cell communication method provided in the embodiment of the present disclosure, channel resources can be dynamically assigned according to real-time services in an MOCN cell, thereby ensuring a utilization ratio of channel resources and also ensuring fairness of resource occupation by communication operators.

Embodiment 4

Figure 4:
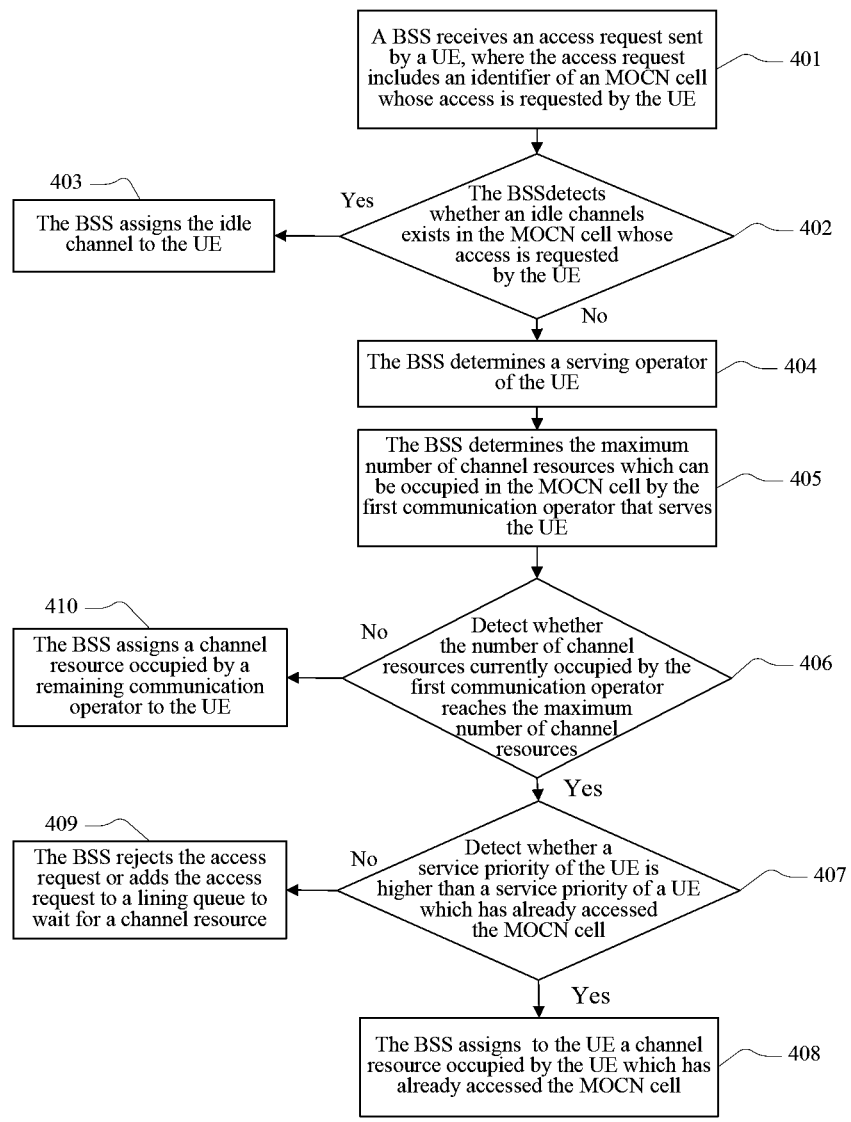
FIG. 4 is a schematic flowchart of an MOCN cell communication method according to Embodiment 3 of the present disclosure.

Based on the embodiment shown in FIG. 3, the embodiment of the present disclosure further provides an MOCN cell communication method. As shown in FIG. 4, the method includes:

401. A BSS receives an access request sent by a UE, where the access request includes an identifier of an MOCN cell whose access is requested by the UE.

402. The BSS detects whether an idle channel exists in the MOCN cell whose access is requested by the UE.

403. If an idle channel exists, the BSS assigns the idle channel to the UE, so that the UE accesses the MOCN cell for communication.

404. If no idle channel exists, the BSS determines a operator to which the UE belongs.

It should be noted that the method provided in this embodiment is applicable to an MOCN cell, where channel resources in the MOCN cell and a BSS device that manages the MOCN cell are shared by multiple communication operators, and the BSS device includes devices such as a plurality of base stations and a BSC. In this embodiment, the BSS can set a preset rule according to negotiation of multiple operators of the MOCN cell, where the preset rule is used to determine, in a scenario where all channel resources of the MOCN cell are occupied, a proportion coefficient of channel resources occupied by each operator to total channel resources of the MOCN cell.

405. The BSS determines, according to the proportion coefficient and the total number of channel resources of the MOCN cell, the maximum number of channel resources which can be occupied by a first communication operator of the UE in the MOCN cell, where the first communication operator is a communication operator to which the UE belongs.

In order to facilitate understanding, this embodiment is described by using an example where the MOCN cell is shared by two communication operators (for example, operator A and operator B) and operator A is the first communication operator.

406. The BSS detects whether the number of channel resources currently occupied by the first communication operator reaches the maximum number of channel resources; and if yes, execute step 407; and if not, execute step 410.

With reference to the example given in this embodiment, the BSS detects whether the number of channel resources currently occupied by operator A reaches the maximum number of channel resources corresponding to operator A. For example, the total number of channel resources of the MOCN cell is Tmax, after negotiation, operator A and operator B determine that, when services of the MOCN cell are busy, the maximum total number of channel resources occupied by operator A is 60% Tmax and the maximum total number of channel resources occupied by operator B is 40% Tmax. Accordingly, an operation to be executed in this step is that the BSS detects whether the total number of channel resources currently occupied by operator A reaches 60% Tmax.

407. The BSS adjusts the channel resources currently occupied by the first communication operator and processes the received access request, which specifically includes: determining a service type of the UE according to the access request and determining a service priority of the UE according to the service type; detecting a service type of a UE, which has already accessed the MOCN cell, of the first communication operator and determining a service priority of the UE which has already accessed the MOCN cell; detecting whether the service priority of the UE is higher than the service priority of the UE which has already accessed the MOCN cell; and if yes, executing 408; and if not, executing 409.

For example, the service priority of a voice service is higher than the priority of a GPRS (general packet radio service), and the service priority of an emergency call (such as a police call) voice service is higher than the priority of a general voice service.

408. The BSS assigns to the UE a channel resource occupied by the UE which has already accessed the MOCN cell, so that the UE accesses the MOCN cell for communication.

409. The BSS rejects the access request or adds the access request to a queue to wait for a channel resource.

With reference to the example given in this embodiment, for example, UE1 and UE2 belong to operator A and have already accessed the MOCN cell, where UE1 executes a voice service and UE2 executes a GPRS service. If the service whose execution is requested by the UE is a voice service, because the service priority of UE2 is lower than that of the service type of the UE, the BSS assigns the service channel of UE2 to the UE.

410. The BSS assigns a channel resource occupied by a remaining communication operator to the UE, so that the UE accesses the MOCN cell for communication, where the remaining communication operator is all communication operator which share the MOCN cell except the first communication operator.

For example, step 410 may be implemented by using the following method: the BSS detects service priorities of UEs, which have already accessed the MOCN cell, of the remaining communication operator; and selects a UE with a lowest service priority from the UEs which have already accessed the MOCN cell as a target UE, and assigns a channel resource occupied by the target UE to the UE, so that the UE accesses the MOCN cell for communication.

It should be emphasized that in step 410, when the BSS assigns a channel resource to the UE, service priorities of UEs, which have already accessed the MOCN cell, of the remaining communication operator are detected to determine a target UE but not to provide a reference for determining whether the UE can pre-empt a channel resource of another UE.

With reference to the example given in this embodiment, for example, if the number of channel resources currently occupied by operator A is smaller than 60% Tmax and a service whose execution is requested by the UE is a GPRS service, because the current assignment condition of channel resources does not satisfy the preset rule, even if services executed by all UEs of operator B which have already accessed the MOCN cell are voice call services (that is, service priorities of all UEs of operator B which have already accessed the MOCN cell are high), the BSS still assigns a resource occupied by a UE of operator B which has already accessed the MOCN cell to the UE which currently requests access to the MOCN cell (where this UE is served by operator A) so as to ensure fairness of channel resource assignment.

According to the MOCN cell communication method provided in the embodiment of the present disclosure, channel resources can be dynamically assigned according to real-time services in the MOCN cell, thereby ensuring a utilization ratio of channel resources and also ensuring fairness of resource occupation by communication operators.

Embodiment 5

Figure 5:
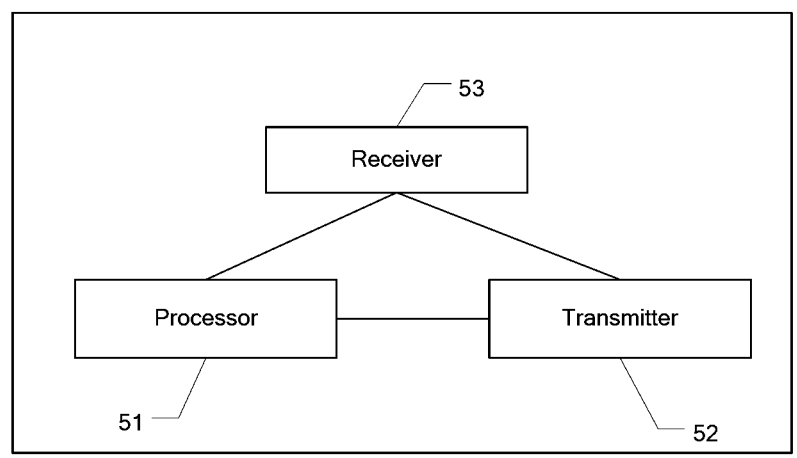
FIG. 5 is a structural diagram of a base station subsystem according to Embodiment 5 of the present disclosure.

The embodiment of the present disclosure provides a base station subsystem, which can implement the method embodiments shown in FIG. 1 and FIG. 2. As shown in FIG. 5, the base station subsystem includes:

a processor 51, adapted to determine the number n of communication operators of an MOCN cell and configure n broadcast control channels BCCHs for the MOCN cell, where the n broadcast control channels are in one-to-one correspondence with the communication operators and are used to broadcast in the MOCN cell public land mobile network PLMN information of the communication operators; and a transmitter 52, adapted to send, to user equipments UEs in the MOCN cell, PLMN information of serving communication operators of the UEs through the n broadcast control channels configured by the processor 51.

Further, as shown in FIG. 5, the base station subsystem further includes:

a receiver 53, adapted to acquire configuration information of the MOCN cell;

where the processor 51 is adapted to determine the number n of communication operators of the MOCN cell according to the configuration information acquired by the receiver 53 and configure idle channels or service channels with low service priorities of the MOCN cell as broadcast control channels, so that the MOCN cell is configured with n broadcast control channels Specifically, the processor 51 is further adapted to determine a serving communication operator of a UE in the MOCN cell as a first operator; and the transmitter 52 is further adapted to send PLMN information of the first operator to the UE through a broadcast control channel which is in one-to-one correspondence with the first operator, so that the UE displays a network name of the first operator.

The base station subsystem provided in the embodiment of the present disclosure can configure multiple broadcast control channels according to the number of communication operators of an MOCN cell and further broadcast PLMN information of the multiple communication operators in the MOCN cell through the multiple broadcast control channels, so that UEs in the MOCN cell can correctly display names of communication operators which the UEs belong to.

Embodiment 6

Figure 6:
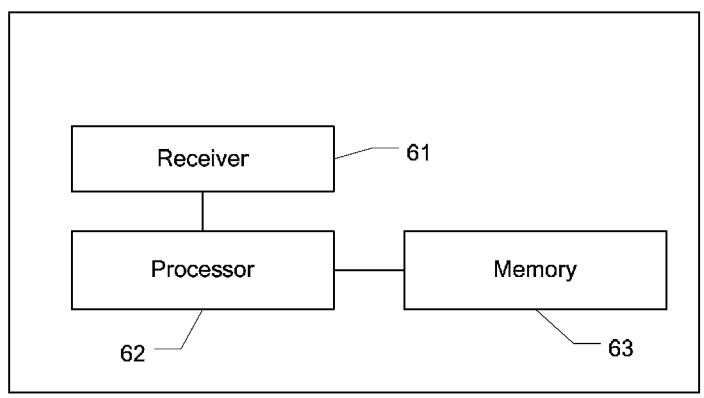
FIG. 6 is a structural diagram of a base station subsystem according to Embodiment 6 of the present disclosure.

The embodiment of the present disclosure provides a base station subsystem, which can implement the method embodiments shown in FIG. 3 and FIG. 4. As shown in FIG. 6, the base station subsystem includes:

a receiver 61, adapted to receive an access request sent by a UE; and a processor 62, adapted to: when the receiver 61 receives the access request, detect whether an idle channel exists in the MOCN cell whose access is requested by the UE; where if an idle channel exists, the processor 62 assigns the idle channel to the UE, so that the UE accesses the MOCN cell for communication; and if no idle channel exists, the processor 62 processes, according to a preset rule, the access request sent by the UE so as to allow the UE to access the MOCN cell by pre-empting a channel resource which is being used by another UE, or reject access of the UE to the MOCN cell.

Further, as shown in FIG. 6, the base station subsystem further includes: a memory 63, adapted to store the preset rule set by negotiation of multiple operators of the MOCN cell, where the preset rule is use to determine, in a scenario where all channel resources of the MOCN cell are occupied, a proportion coefficient of channel resources occupied by each operator to total channel resources of the MOCN cell.

Specifically, the processor 62 is further adapted to determine, according to the proportion coefficient set by the preset rule stored in the memory 63 and the total number of channel resources of the MOCN cell, the maximum number of channel resources which can be occupied by a first communication operator of the UE in the MOCN cell, where the first communication operator is a communication operator to which the UE belongs; and the processor 62 is further adapted to detect whether the number of channel resources currently occupied by the first communication operator reaches the maximum number of channel resources; and if yes, adjust the channel resources currently occupied by the first communication operator and process the received access request; and if not, assign a channel resource occupied by a remaining communication operator to the UE, so that the UE accesses the MOCN cell for communication, where the remaining communication operator is all communication operator which share the MOCN cell except the first communication operator.

In one aspect, the processor 62 is specifically adapted to determine a service type of the UE according to the access request and determine a service priority of the UE according to the service type, detect a service type of a UE, which has already accessed the MOCN cell, of the first communication operator and determine a service priority of the UE which has already accessed the MOCN cell;

specifically, the processor 62 is further adapted to: if the service priority of the UE is higher than the service priority of the UE which has already accessed the MOCN cell, assign to the UE a channel resource occupied by the UE which has already accessed the MOCN cell, so that the UE accesses the MOCN cell for communication; and the processor 62 is further adapted to: if the service priority of the UE is lower than or equal to the service priority of the UE which has already accessed the MOCN cell, reject the access request or add the access request to a queue to wait for a channel resource.

In another aspect, the processor 62 is further adapted to detect service priorities of UEs, which have already accessed the MOCN cell, of the remaining communication operator; and select a UE with a lowest service priority from the UEs which have already accessed the MOCN cell as a target UE, and assign a channel resource occupied by the target UE to the UE, so that the UE accesses the MOCN cell for communication.

The base station subsystem provided in the embodiment of the present disclosure can assign channel resources dynamically according to real-time services in an MOCN cell, thereby ensuring a utilization ratio of channel resources and also ensuring fairness of resource occupation by communication operators.

By using the foregoing description of the embodiments, a person skilled in the art can clearly understand that the present disclosure may be implemented by software plus necessary universal hardware, and definitely may also be implemented by hardware. However, under most circumstances, the former is preferred. Based on such an understanding, the technical solutions of the present disclosure essentially, or the part contributing to the prior art may be implemented in the form of a software product. The computer software product is stored in a readable storage medium, for example, a floppy disc, a hard disk, or an optical disc of a computer, and includes several instructions for instructing a computer device (which may be a personal computer, a server, or a network device or the like) to perform the methods described in the embodiments of the present disclosure.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A multiple operator core network (MOCN) cell communication method, comprising:

determining, by a base station subsystem, a number n of communication operators of an MOCN cell;

configuring n broadcast control channels (BCCHs) for the MOCN cell, wherein the n BCCHs are in a one-to-one correspondence with the n communication operators and are used to broadcast in the MOCN cell public land mobile network (PLMN) information of the n communication operators; and sending, to a user equipment (UE) in the MOCN cell, PLMN information of a communication operator to which the UE belongs through a BCCH corresponding to the communication operator of the n BCCHs, wherein the determining the number n of communication operators of the MOCN cell comprises acquiring configuration information of the MOCN cell and determining the number n of communication operators of the MOCN cell, and wherein the configuring the n BCCHs for the MOCN cell comprises configuring idle channels or service channels with low service priorities of the MOCN cell as BCCHs, so that the MOCN cell is configured with n BCCHs.

2. The method according to claim 1, wherein the sending, to the UE in the MOCN cell, the PLMN information of the communication operator to which the UE belongs through the BCCH comprises:

determining the communication operator to which the UE in the MOCN cell belongs as a first operator; and sending PLMN information of the first operator to the UE through a BCCH which is in a one-to-one correspondence with the first operator, to enable the UE to display a network name of the first operator.

3. A method for allocating a group of channel resources of a multiple operator core network (MOCN) cell shared by multiple communication operators, comprising:

receiving, by the MOCN cell, an access request sent by a requesting user equipment (UE) associated with a first communication operator; and providing, in response to the access request sent by the requesting UE, conditional access to a channel resource of the group of channel resources of the MOCN cell by:

assigning, by a subsystem associated with the MOCN cell, a detected idle channel resource in the group of channel resources in the MOCN cell without regard to a preset rule for allocating the group of channel resources to UEs associated with particular ones of the multiple communications operators to enable the requesting UE to access the MOCN cell for communication, and otherwise conditionally reallocating access to a non-idle channel resource of the group of channel resources by:

allocating access to the non-idle channel resource, by the requesting UE in place of another UE currently accessing the non-idle channel, using the preset rule that specifies a proportion coefficient, and otherwise rejecting the access request of the requesting UE to the group of channel resources, wherein the allocating access to the non-idle channel resource using the preset rule comprises:

first determining, using the proportion coefficient, a first quantity of first operator-specific channel resources, of the group of channel resources of the MOCN cell, to which simultaneous access is assured for UEs associated with the first communication operator, second determining a second quantity of EUs associated with the first communication operator that are presently allocated to the group of channel resources, conditionally designating the non-idle channel resource, from the group of channel resources of the MOCN cell, by assigning the non-idle channel resource currently used by another UE that is not associated with the first communication operator only if the second quantity is less than the first quantity, and otherwise assigning the non-idle channel resource currently used by another UE that is associated with the first communication operator.

4. The method according to claim 3, wherein the assigning the non-idle channel resource currently used by another UE that is associated with the first communication operator comprises:

determining a first service type of the requesting UE according to the access request and determining a first service priority of the UE according to the first service type;

detecting a second service type of the another UE associated with the first communication operator and determining a second service priority of the another UE;

assigning the non-idle channel resource only if the first service priority is higher than the second service priority.

5. The method according to claim 3, wherein the assigning the non-idle channel resource currently used by the another UE that is not associated with the first communication operator comprises:

detecting service priorities of a set of other UEs, which currently have access to one of the group of channel resources of the MOCN cell, that are not associated with the first communication operator; and assigning the non-idle channel resource by:

selecting a currently accessing UE with a lowest service priority from the UEs, which have already accessed the MOCN cell, as a target UE, and assigning the non-idle channel resource occupied by the target UE to the requesting UE.

6. A base station subsystem, comprising:

a transmitter;

a receiver;

a non-transitory computer-readable medium including computer-executable instructions; and a processor, configured to execute the computer-executable instructions to provide public land mobile network (PLMN) information of multiple providers associated with a multiple operator core network (MOCN) cell to user equipment (UE) by performing a method comprising:

determining a number n of communication operators of the MOCN cell;

configuring n broadcast control channels (BCCHs) for the MOCN cell, wherein the n BCCHs are in a one-to-one correspondence with the n communication operators and are used to broadcast in the MOCN cell the PLMN information of the n communication operators; and sending using the transmitter, to a UE in the MOCN cell, PLMN information of a communication operator to which the UE belongs through a BCCH corresponding to the communication operator of the n BCCHs, wherein the determining the number n of communication operators of the MOCN cell comprises acquiring, using the receiver, configuration information of the MOCN cell and determining the number n of communication operators of the MOCN cell, and wherein the configuring n BCCHs for the MOCN cell comprises configuring idle channels or service channels with low service priorities of the MOCN cell as BCCHs, so that the MOCN cell is configured with n BCCHs.

7. The base station subsystem according to claim 6, wherein:

the processor is further configured to carry out the method including:
  determining a communication operator to which the UE in the MOCN cell belongs as a first operator; and
  sending, using the transmitter, PLMN information of the first operator to the UE through a BCCH which is in a one-to-one correspondence with the first operator, to enable the UE to display a network name of the first operator.

8. A base station subsystem, comprising:
  a receiver, configured to receive an access request sent by a user equipment (UE) associated with a first communication operator;
  a non-transitory computer-readable medium including computer-executable instructions; and
  a processor, configured to execute the computer-executable instructions to carry out a method for allocating, by the base station subsystem, a group of channel resources of a multiple operator control network (MOCN) cell shared by multiple communication operators, the method comprising:
  receiving, by receiver, the access request sent by the requesting UE; and
  providing, in response to the access request sent by the requesting UE, conditional access to a channel resource of the group of channel resources of the MOCN cell by:
    assigning a detected idle channel resource in the group of channel resources in the MOCN cell without regard to a preset rule for allocating the group of channel resources to UEs associated with particular ones of the multiple communications operators to enable the requesting UE to access the MOCN cell for communication; and otherwise
    conditionally reallocating access to a non-idle channel resource of the group of channel resources by:
      allocating access to the non-idle channel resource, by the requesting UE in place of another UE currently accessing the non-idle channel, using the preset rule that specifies a proportion coefficient, and otherwise
      rejecting the access request of the requesting UE to the group of channel resources,
    conditionally reallocating access to a non-idle channel resource of the group of channel resources by:
      allocating access to the non-idle channel resource, by the requesting UE in place of another UE currently accessing the non-idle channel, using the preset rule that specifies a proportion coefficient, and otherwise rejecting the access request of the requesting UE to the group of channel resources,
    wherein the allocating access to the non-idle channel resource using the preset rule comprises:
      first determining, using the proportion coefficient, a first quantity of first operator-specific channel resources, of the group of channel resources of the MOCN cell, to which simultaneous access is assured for UEs associated with the first communication operator,
      second determining a second quantity of EUs associated with the first communication operator that are presently allocated to the group of channel resources,
      conditionally designating the non-idle channel resource, from the group of channel resources of the MOCN cell, by assigning the non-idle channel resource currently used by another UE that is not associated with the first communication operator only if the second quantity is less than the first quantity, and otherwise assigning the non-idle channel resource currently used by another UE that is associated with the first communication operator.

9. The base station subsystem according to claim 8, wherein the processor is further configured to perform the assigning the non-idle channel resource currently used by another UE that is associated with the first communication operator by:
  determining a first service type of the requesting UE according to the access request and determining a first service priority of the requesting UE according to the service type,
  detecting a second service type of the another UE associated with the first communication operator and determining a second service priority of the another UE;
  assigning the non-idle channel resource only if the first service priority is higher than the second service priority.

10. The base station subsystem according to claim 8, wherein the processor is further configured, during the assigning the non-idle channel resource currently used by the another UE that is not associated with the first communication operator, to perform the further steps of:
  detecting service priorities of UEs, which currently have access to one of the group of channel resources of the MOCN cell, that are not associated with the first communication operator; and
  assigning the non-idle channel resource by:
    selecting a currently accessing UE with a lowest service priority from the UEs which have already accessed the MOCN cell as a target UE, and
    assigning the non-idle channel resource occupied by the target UE to the requesting UE.

* * * * *